Patented June 2, 1925.

1,540,738

UNITED STATES PATENT OFFICE.

HERMANN EMDE, OF BERLIN-LANKWITZ, GERMANY, ASSIGNOR TO CHEMISCHE FABRIK AUF ACTIEN (VORM. E. SCHERING), OF BERLIN, GERMANY.

PROCESS OF MANUFACTURING HYDROQUINONE.

No Drawing.     Application filed August 9, 1921. Serial No. 490,888.

*To all whom it may concern:*

Be it known that I, HERMANN EMDE, citizen of Germany, residing at Berlin-Lankwitz, Germany, have invented a new and useful Improvement in Processes for Manufacturing Hydroquinone, of which the following is a specification.

The quinhydrone resulting during the reduction of quinone to hydroquinone by means of the methods used hitherto proves to be very resistant against the substances used for reduction in those methods when the quinhydrone is not dissolved in water but only suspended.

I now have found out that quinhydrone even when not dissolved can be reduced to hydroquinone very quickly and with an excellent output when being heated with iron and water.

*Example.*

To a boiling and thoroughly agitated mixture of 2.2 parts of iron and 60 parts of water 5.5 parts of quinhydrone are added, taking care that no quinone vapors escape. From this mixture which is to be boiled another ½ hour the hydroquinone is isolated as usual.

This process can be taken advantage of in the reduction of quinone to hydroquinone by reducing the quinone to about quinhydrone in the usual way and heating the reaction mixture containing quinhydrone with iron and water.

*Example.*

The sulphuric quinone solution obtained by the oxidation of 9.3 parts of anilin is mixed with 2.8 parts of iron powder or with the quantity of iron powder necessary for neutralizing the free acid, until the iron is essentially dissolved, this mixture being added to a well agitated boiling mixture of 2.2 parts of iron powder and 30 parts of water. The hydroquinone is isolated in the usual way.

I claim as my invention:

1. The process of making hydroquinone which consists in heating a quinhydrone with iron and water.

2. The process of making hydroquinone which consists in adding a quinhydrone to a boiling mixture of iron and water, taking care that no quinone vapors escape, heating the mixture further and isolating the hydroquinone.

3. The process of making hydroquinone, which consists in heating with iron and water the reaction mixture, resulting from reducing quinone to about quinhydrone in the usual way.

4. The process of making hydroquinone, which consists in gradually adding the reaction mixture, resulting from reducing quinone to about quinhydrone in the usual way, to a boiling mixture of iron and water and isolating the hydroquinone.

In testimony whereof I have hereunto set my signature in the presence of two subscribing witnesses.

HERMANN EMDE.

Witnesses:
SCHALLER,
LINDEMANN.